(No Model.)
W. L. THOMPSON.
BICYCLE CANOPY.
No. 496,073. Patented Apr. 25, 1893.
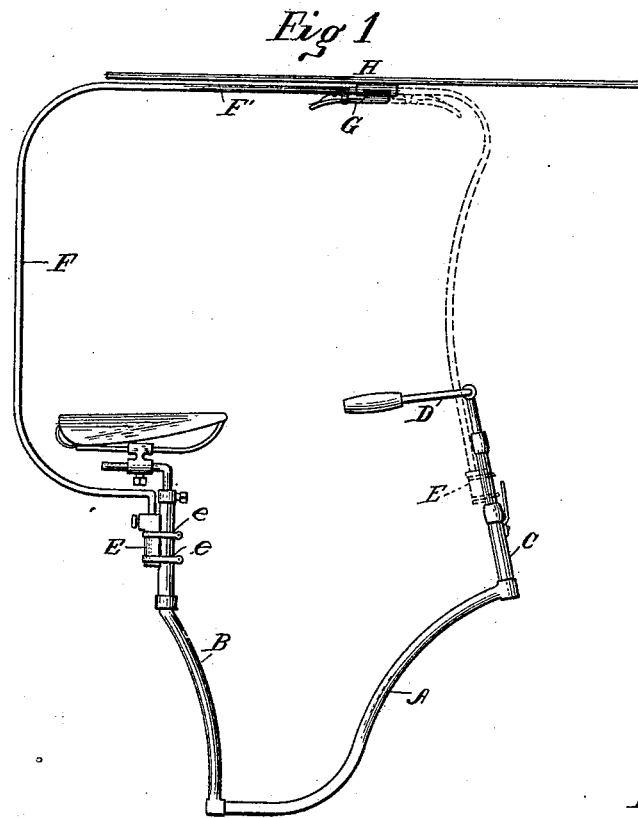
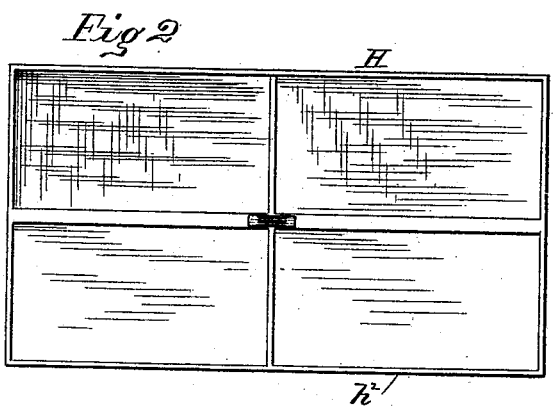
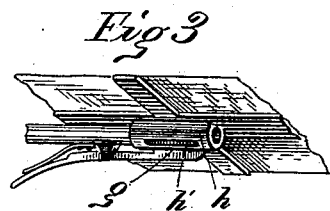
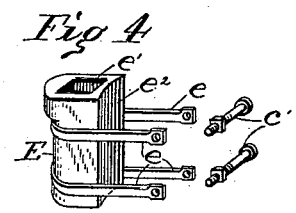
Witnesses
C. C. Burdine
L. S. Bacon
Inventor
William L. Thompson
By Sheldon A. Wood
Attorney

UNITED STATES PATENT OFFICE.

WILLIAM L. THOMPSON, OF PORT HURON, MICHIGAN.

BICYCLE-CANOPY.

SPECIFICATION forming part of Letters Patent No. 496,073, dated April 25, 1893.

Application filed August 26, 1892. Serial No. 444,195. (No model.)

*To all whom it may concern:*

Be it known that I, WILLIAM L. THOMPSON, a citizen of the United States, residing at the city of Port Huron, in the county of St. Clair and State of Michigan, have invented certain new and useful Improvements in Velocipede or Bicycle Canopies; and I do hereby declare the following to be full, clear, and exact description of the invention, such as will enable others skilled in the art to which it appertains to make and use the same.

My invention relates to improvements in velocipede or bicycle canopies in which an adjustable canopy is provided for protection against wind or sun.

The objects of my invention are:—(First) to provide a bicycle canopy which shall be light, strong and firm. (Second) a bicycle canopy which shall not offer resistance to the wind, and easily removed or placed in position. (Third) a bicycle canopy which shall be simple and cheap in construction and adapted for use upon any bicycle, whether constructed for use by men or by ladies. I obtain these objects by the construction illustrated in the accompanying drawings in which—

Figure 1 shows the canopy as attached to both men's and ladies' form of bicycle. Fig. 2 shows the construction of the canopy proper, as seen from below. Fig. 3 illustrates the means employed in attaching the canopy to the upright which supports it. Fig. 4 shows the device employed for attaching the upright to the bicycle.

Similar letters refer to similar parts throughout the several views.

Taking Fig. 1, A is the back bone of bicycle: B the upright supporting the saddle; E, the clamp which is attached to the saddle support as shown, by two metallic straps and bolts, $e, e$. The canopy, H, is held in place by the clip, G. F, F' is a canopy support.

In case the device is desired to be used upon a man's bicycle, the upright canopy support takes the form shown by the dotted lines. The socket E is fastened to the head of the bicycle and the canopy support is received in the socket and passes back of the handle bar D. The canopy is reversed and fastened in place by the clip G.

Fig. 2 shows the canopy, detached from the upright, and viewed from below. It consists of a light metallic frame, $h^2$ which is covered by silk, rubber or some suitable fabric.

In Fig. 3 the device for fastening canopy to canopy support is seen. The end of the support is round, and carries the spring clip $g$. The thimble, $h$, is firmly attached to the frame of canopy, and receives the end of the upright, F, F'. Three longitudinal slots are provided in the thimble, one on that part diametrically opposite the canopy body and one on each side of the first named slot. Should it be desired to set the canopy at an angle for better protection to the rider, the canopy is turned by moving the thimble upon the upright F', and the clip allowed to engage one of the slots in side of thimble.

In Fig. 4 is seen the socket for receiving the canopy support. The uprights may be made either solid or tubular, but are square at lower end and enter the square hole $e'$. The socket, E is held by the metallic bands, $e, e$, which are provided with holes for reception of bolts as shown. The upright may be further secured by a set screw inserted in the socket. The side $e^2$ is curved to allow it to fit snugly against the bicycle.

By the above description it is seen I have invented a very useful canopy for velocipedes or bicycles.

What I claim as my invention, and desire to secure by Letters Patent, is—

1. A bicycle canopy support, having at its upper end a spring pressed lever, formed with a projection on its end, in combination with a canopy having a slotted tubular securing member with which the projection on the lever engages, substantially as described.

2. In a bicycle canopy, the combination with a canopy and a support of an adjustable connection between the same consisting of a slotted socket, and a spring clip for engaging the socket, substantially as described.

3. In a bicycle canopy, the combination with a canopy support, of a canopy having a tubular securing member thereon formed with a series of elongated slots therein, and a lever on the support having an extension entering the slots, substantially as described.

In testimony whereof I have affixed my signature in presence of two witnesses.

WILLIAM L. THOMPSON.

Witnesses:
   S. A. WOOD,
   C. S. FRASER.